July 16, 1946.  J. F. HAMLIN  2,404,228
HYDRAULIC EGG TURNING MECHANISM
Filed Dec. 27, 1943  2 Sheets-Sheet 2
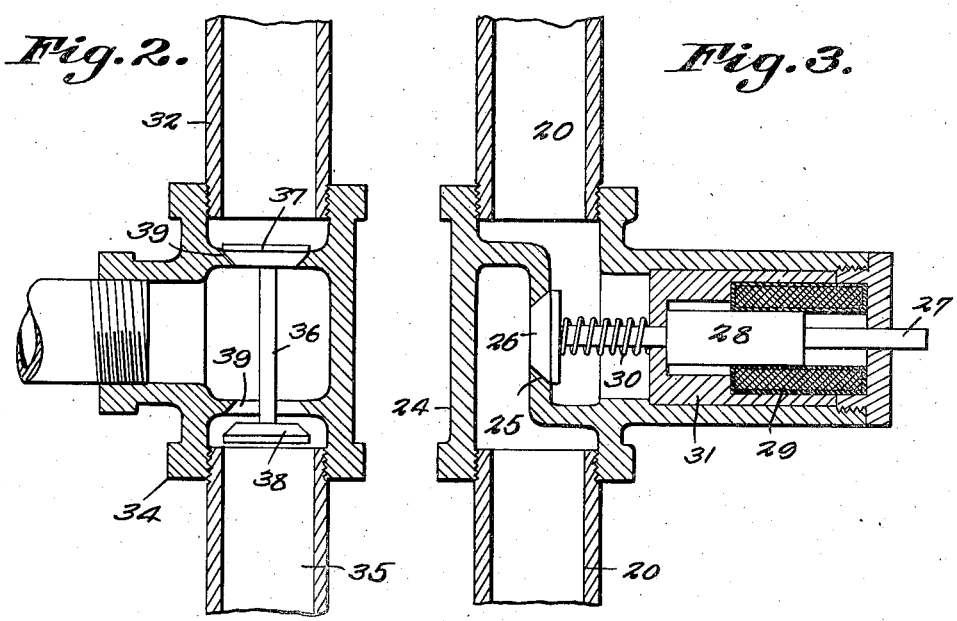
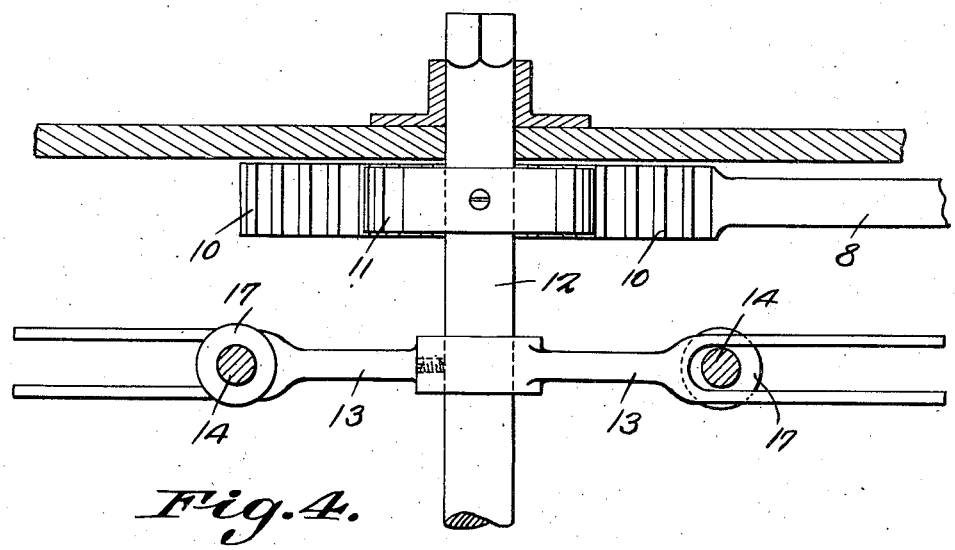
J. F. Hamlin
INVENTOR.
BY
ATTORNEYS.

Patented July 16, 1946

2,404,228

UNITED STATES PATENT OFFICE 2,404,228

HYDRAULIC EGG TURNING MECHANISM

Jerry F. Hamlin, Mill Valley, Calif.

Application December 27, 1943, Serial No. 515,742

1 Claim. (Cl. 74—110)

This invention relates to egg turning devices designed primarily for use in incubator construction of the battery type, wherein large numbers of eggs are incubated.

An object of the invention is to provide an egg turning means which will be automatic in its operation, and one which will turn a great number of eggs simultaneously with a single operation of an electrical switch, thereby reducing time and labor for turning the eggs in large incubators, to the minimum.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a sectional view through the automatic valve that controls the release of the fluid used in operating the mechanism.

Figure 3 is a sectional view through one of the electrically controlled valves of the mechanism.

Figure 4 is a sectional view taken on line 4—4 of Figure 1.

Figure 1:
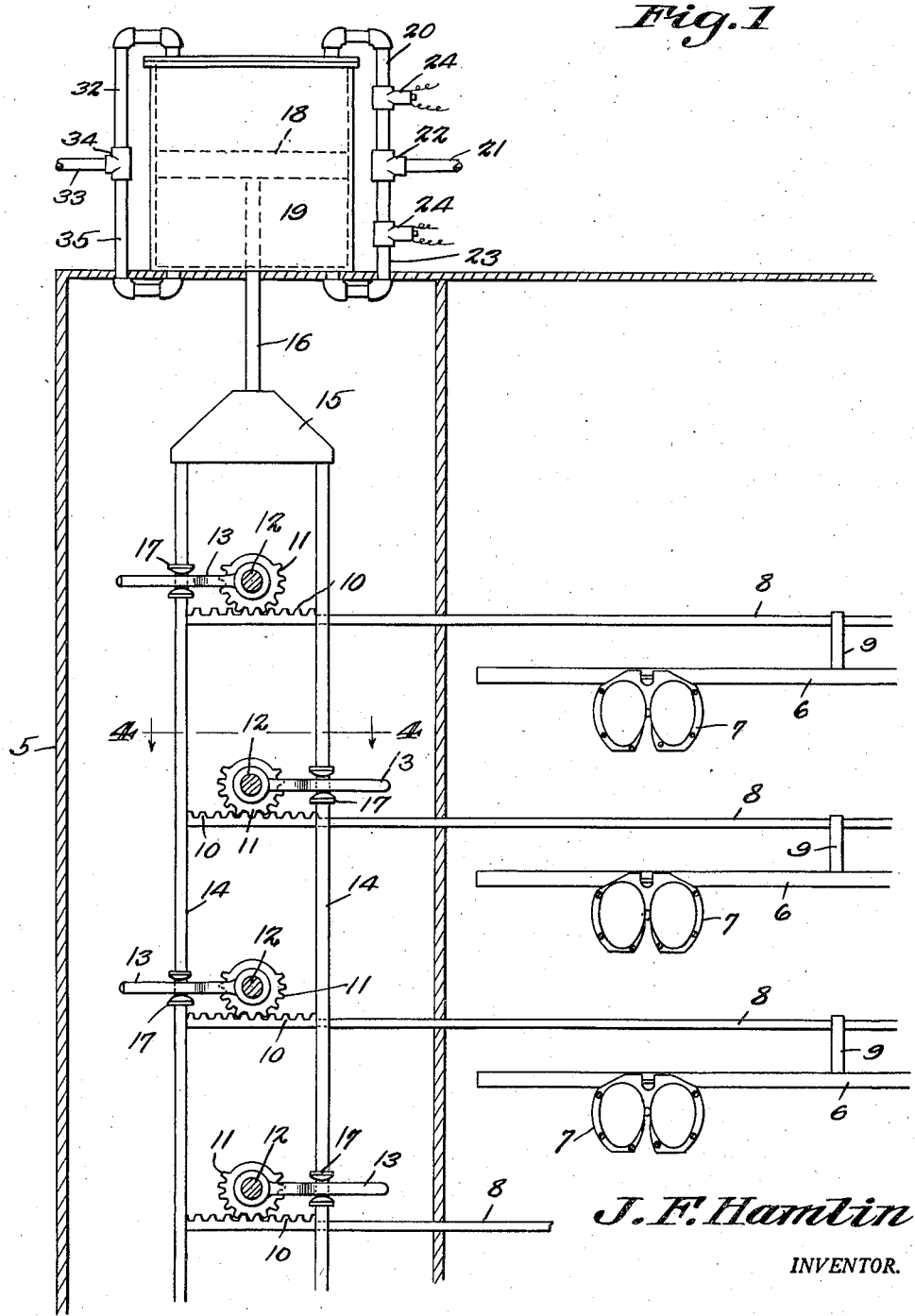
Figure 1 is a fragmental sectional view through an incubator, illustrating an egg turning mechanism, constructed in accordance with the invention, as mounted therein.

Referring to the drawings in detail, the reference character 5 designates one end of an incubator cabinet in which the egg trays are supported.

The reference character 6 designates the channel bars that have connection with the egg cradles 7, and which move to move the egg cradles in turning the eggs.

These channel bars are operated by reciprocating rods 8, that connect with the channel bars 6, through the bars 9.

These rods 8 are formed with teeth 10, which teeth mesh with the gears 11 that in turn are secured to the shafts 12 that are horizontally disposed within the cabinet. The shafts 12 are arranged one above the other, as shown by Figure 1 of the drawings.

Forked arms 13 are secured to the shafts 12, the forked ends of the arms extending to positions where they straddle vertical rods 14 of the turning mechanism.

The upper ends of the rods 14 are connected by the member 15 to which the rod 16 is connected. Formed on the rods 14, and disposed at opposite sides of the vertical rods 14, are enlargements 17 which are engaged by the forked ends of the arms 13, so that vertical movement of the rods 14, will act to swing the forked arms, predetermined distances.

Mounted at the upper end of the rod 16, is a piston 18 that moves within the cylinder 19.

The pipe indicated at 20 has one end thereof extending into one end of the cylinder 19, the opposite end thereof being connected with the supply pipe 21, through the union 22. A pipe 23 extends into the opposite end of the cylinder 19, and also connects with the supply pipe 21, through the union 22. Valves 24 are mounted within the pipes 20 and 23, and each of these valves includes a valve seat 25 and a valve member 26 which controls the flow of fluid through the pipe. A rod 27 forms a part of each of these valves, and a solenoid core 28 is mounted on the rod 27. The solenoid coil is indicated at 29 and is adapted to control the movements of the valve 26, to unseat the valve, when the coil is energized. It will of course be understood that the coil is supplied with electric energy from a suitable source of supply not shown, and the current to the coil will be controlled by the usual electric switch not shown.

A coiled spring indicated at 30 is mounted on the valve rod, between the valve 26 and casing 31 that provides a support for the solenoid coil, the coiled spring acting to reseat the valve, after the electric current to the coil has been cut off.

A pipe indicated at 32 has one end thereof extending into one end of the cylinder 19, and connects with the outlet pipe 33, through the valve housing 34. A pipe 35 also connects with the valve housing 34 and communicates with the opposite end of the cylinder 19, as shown by Figure 1.

Mounted within the valve housing 34 is a valve rod 36 that carries valves 37 and 38 at its ends, the valves 37 and 38 adapted to seat at 39 to cut off the flow of fluid through the pipe 33. It might be stated that the rod 36 is of such a length that when one valve is closed, the opposite valve is opened, as shown by Figure 2, and the movements of these valves are controlled by the fluid pressure, entering the pipes 32 and 35.

When it is desired to turn or shift the eggs, during the incubating period, and assuming that the piston 18 is in the position shown by Figure 1, it is only necessary to complete the circuit to the solenoid coil 29, of the lowermost valve. This of course may be accomplished by a time clock not shown, or by a switch which is of the manually controlled type. The coil will act to retract the valve 26, opening the passageway and allowing fluid to enter under the piston 18. The fluid will also enter the pipe 35, contacting the valve 38, closing the valve and simultaneously opening the valve 37 to allow the fluid above the piston, to seep through the pipe 33. The piston 18 will now be elevated, with the result that the rods 14 will move upwardly, operating the forked arms. As the arms 13 move upwardly, and since alternate arms are connected with opposite rods 14, the adjacent rods 8 will be moved in opposite directions, turning the eggs.

When it is again desired to turn the eggs, the opposite valve 24 is operated to admit fluid to the upper side of the piston 18, moving the piston downwardly and operating the rods 8 in the opposite directions.

Since the rods 8 are connected with the channel bars 6, through the bars 9, the egg cradles 7, which are connected with the channel bars 6, and in which the eggs are positioned, will be moved to properly turn the eggs.

What is claimed is:

An egg turning device for battery incubators, comprising a plurality of horizontal reciprocating rods adapted to operate egg cradles, teeth formed on the upper edges of the rods adjacent to one of the respective ends thereof, spaced vertical rods, means for connecting the rods at their upper ends, gears meshing with the teeth of the horizontal reciprocating rods, pairs of spaced enlargements secured on the vertical rods, forked arms movable with the gears and adapted to straddle the vertical rods between the enlargements of each pair, adjacent forked arms being connected to opposite vertical rods, and said arms adapted to move the reciprocating rods in opposite directions.

JERRY F. HAMLIN.